United States Patent
Aizawa

(10) Patent No.: US 6,344,018 B1
(45) Date of Patent: *Feb. 5, 2002

(54) PRESS MACHINE

(75) Inventor: Hideto Aizawa, Inuyama (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,044

(22) Filed: Nov. 24, 1998

(30) Foreign Application Priority Data

Dec. 26, 1997 (JP) .............................................. 9-358843

(51) Int. Cl.$^7$ .............................................. B23Q 3/157
(52) U.S. Cl. ................................. 483/29; 483/5; 483/9; 483/10; 700/179; 83/549; 72/15.1
(58) Field of Search ............................... 483/4, 5, 7, 8, 483/9, 10, 28, 29; 83/553, 549, 552; 700/179; 72/15.1, 14.9, 14.8, 442, 446

(56) References Cited

U.S. PATENT DOCUMENTS

| | | | | |
|---|---|---|---|---|
| 3,618,836 A | * | 11/1971 | Bushnell et al. .............. 83/553 |
| 3,921,486 A | * | 11/1975 | Valente ......................... 83/552 |
| 4,503,741 A | * | 3/1985 | Hunter et al. ................. 83/549 |
| 4,588,339 A | * | 5/1986 | Bilz ............................ 409/234 |
| RE32,837 E | * | 1/1989 | Corni ............................ 483/9 |
| 4,809,426 A | * | 3/1989 | Takeuchi et al. .............. 29/568 |
| 4,850,766 A | * | 7/1989 | Furuhashi et al. .......... 409/234 |
| 4,890,306 A | * | 12/1989 | Noda ........................... 377/15 |
| 4,901,427 A | * | 2/1990 | Sakamoto et al. ............ 483/29 |
| 4,922,591 A | * | 5/1990 | Campbell ..................... 483/22 |
| 5,046,014 A | * | 9/1991 | Anjo .............................. 483/9 |
| 5,215,513 A | * | 6/1993 | Maynard et al. .............. 483/29 |
| 5,244,447 A | * | 9/1993 | Tanaka et al. .................. 483/4 |
| 5,257,199 A | * | 10/1993 | Tsujino et al. ................. 483/4 |
| 5,299,477 A | * | 4/1994 | Miyajima ....................... 483/5 |
| 5,301,585 A | * | 4/1994 | Hosaka ........................ 83/549 |
| 5,342,276 A | * | 8/1994 | Fujiwara et al. .............. 483/29 |
| 5,378,218 A | * | 1/1995 | Daimaru et al. ............... 483/9 |
| 5,478,301 A | * | 12/1995 | Takahashi .................... 483/28 |
| 5,595,560 A | * | 1/1997 | Kamada ....................... 483/29 |
| 5,669,866 A | * | 9/1997 | Julian et al. .................. 483/29 |
| 5,778,749 A | * | 7/1998 | Dunn ........................... 83/549 |
| 5,882,285 A | * | 3/1999 | Seto et al. .................... 483/29 |
| 5,943,240 A | * | 8/1999 | Nakamura ..................... 483/8 |
| 6,013,017 A | * | 1/2000 | Aizawa ........................ 483/29 |
| 6,047,579 A | * | 4/2000 | Schmitz ....................... 700/179 |
| 6,163,734 A | * | 12/2000 | Shigefuji et al. ............... 483/9 |

FOREIGN PATENT DOCUMENTS

JP            61-103629         5/1986

* cited by examiner

*Primary Examiner*—William Briggs
*Assistant Examiner*—Erica E Cadugan
(74) *Attorney, Agent, or Firm*—Armstrong, Westerman, Hattori, McLeland & Naughton, LLP

(57) ABSTRACT

A punch press is replaced for processing where the punch press has a cartridge on which a plurality of tools are mounted. The punch press includes a control apparatus for controlling a press machine body and a tool information storage device for storing plural pieces of tool information and tool identification information on each of the tools in such a way that the pieces of information mutually correspond. It also includes a cartridge replacement input device for inputting the tool identification information to the control apparatus. The control apparatus has an identification device for using the input tool identification information to identify the tool information on the plurality of tools stored in the tool information storage device.

8 Claims, 5 Drawing Sheets

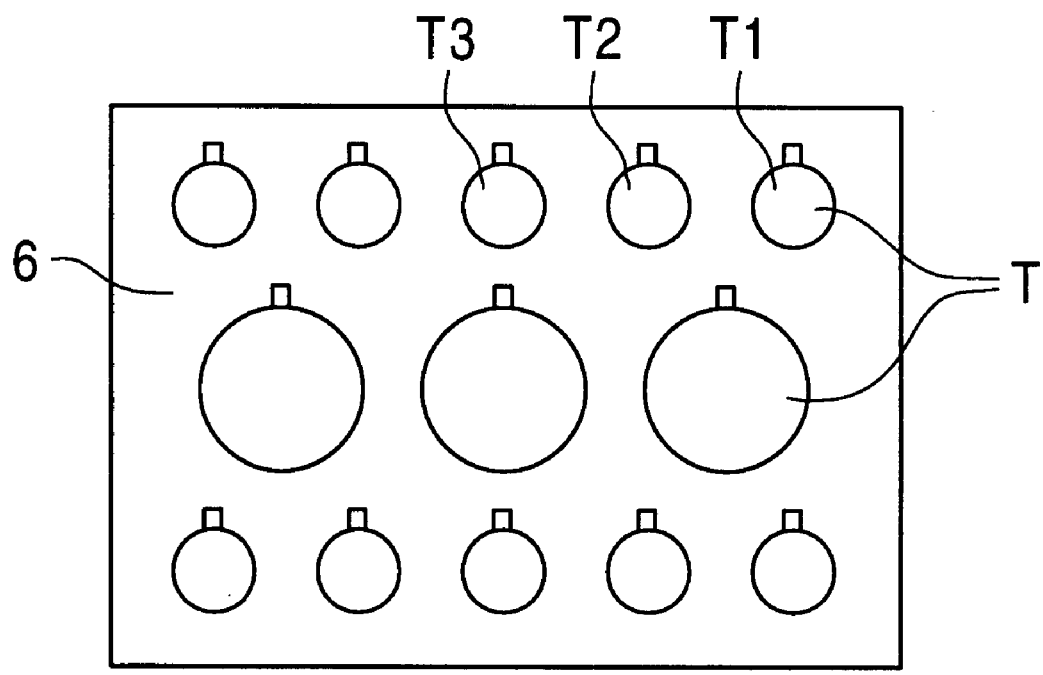

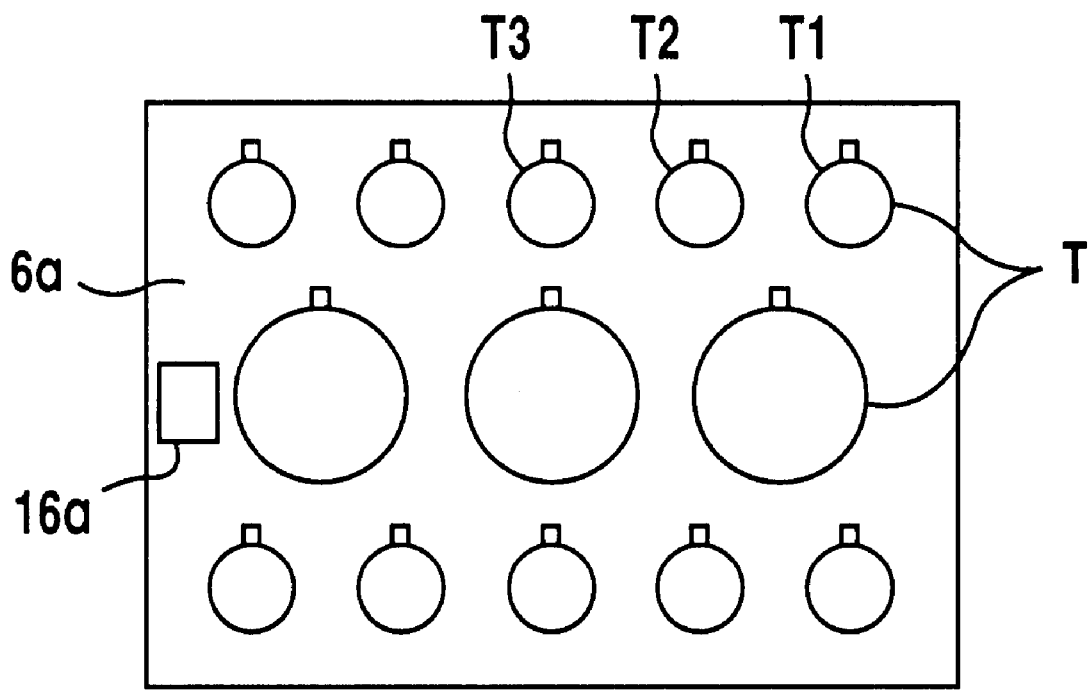

PRESS MACHINE

FIELD OF THE INVENTION

The present invention relates to a press machine such as a cartridge type punch press wherein a cartridge on which a plurality of tools are mounted is replaced for processing on a turret type punch press etc.

BACKGROUND OF THE INVENTION

Cartridge type or turret type punch presses are sheet metal processing machines that are able to deal with various processes through replacement of tools as appropriate. However, it is currently essential to input tool parameters in parallel with the replacement of tools in order to meet demands for increased speed, improved quality and reduced noise. There are also growing needs concerning the information required to manage tool history (wear).

The inputting of the tool parameters must be carried out for each tool and involves a large amount of information, and thus requires substantial time. In addition, these parameters are manually input, resulting in frequent errors. In particular, in a punch press such as a press machine including an automatic cartridge replacemant apparatus in which a large number of tools are replaced at one time, the input-output process required for the tool parameters and history may reduce productivity.

It is an object of the present invention to provide a press machine that eliminates the needs for the manual input of tool information to a control apparatus which is otherwise required to replace tools, thereby avoiding input errors. It is another object of the present invention to enable tools to be simply monitored for wear. It is yet another object of the present invention to enable tool information to be simply managed.

SUMMARY OF THE INVENTION

The press machine comprises a press machine body including a tool holder on which a plurality of tools are mounted in order to process a workpiece such as metal plate and a control means for controlling the press machine body. It also comprises a storage means for storing tool information and tool identification information for each tool in such a way that the pieces of information mutually correspond, and an input means for inputting the tool identification information, wherein the control means includes an identification means for identifying the stored tool information on the tools based on the input tool identification information.

According to this configuration, when, for example, the tool holder is replaced in order to replace the tools, the input means inputs the tool identification information to a storage section in the control means. Based on the input tool identification information, the identification means in the control means identifies the tool information on the tools stored in the tool information storage means. Thus, the tool information required for processing can be obtained without any need for manual inputting of tool information to the control apparatus which is conventionally required to replace tools, that is, a cartridge. This configuration also avoids input errors made by an operator.

In the above configuration, the tool information comprises information on the types and history of the tools, and the tool history information may comprise the number of punches using the tool. The control means includes a history rewrite means for counting the number of punches to rewrite the tool history information in the tool information stored in the storage means. According to this configuration, the history of the individual tool, as indicated by the number of punches, is rewritten in response to the operation of a punch press. Consequently, the tools can be simply monitored for wear. In these configurations, the tool identification information may comprise numbers specific to the individual tools, enabling tool information to be managed easily.

BRIEF DESCRIPTION OF THE DRAWINGS

FIG. 3 is a top view of a cartridge.

FIG. 3a is a top view of a different embodiment of the cartridge.

DETAILED DESCRIPTION OF THE PREFERRED EMBODIMENTS

Figure 1:
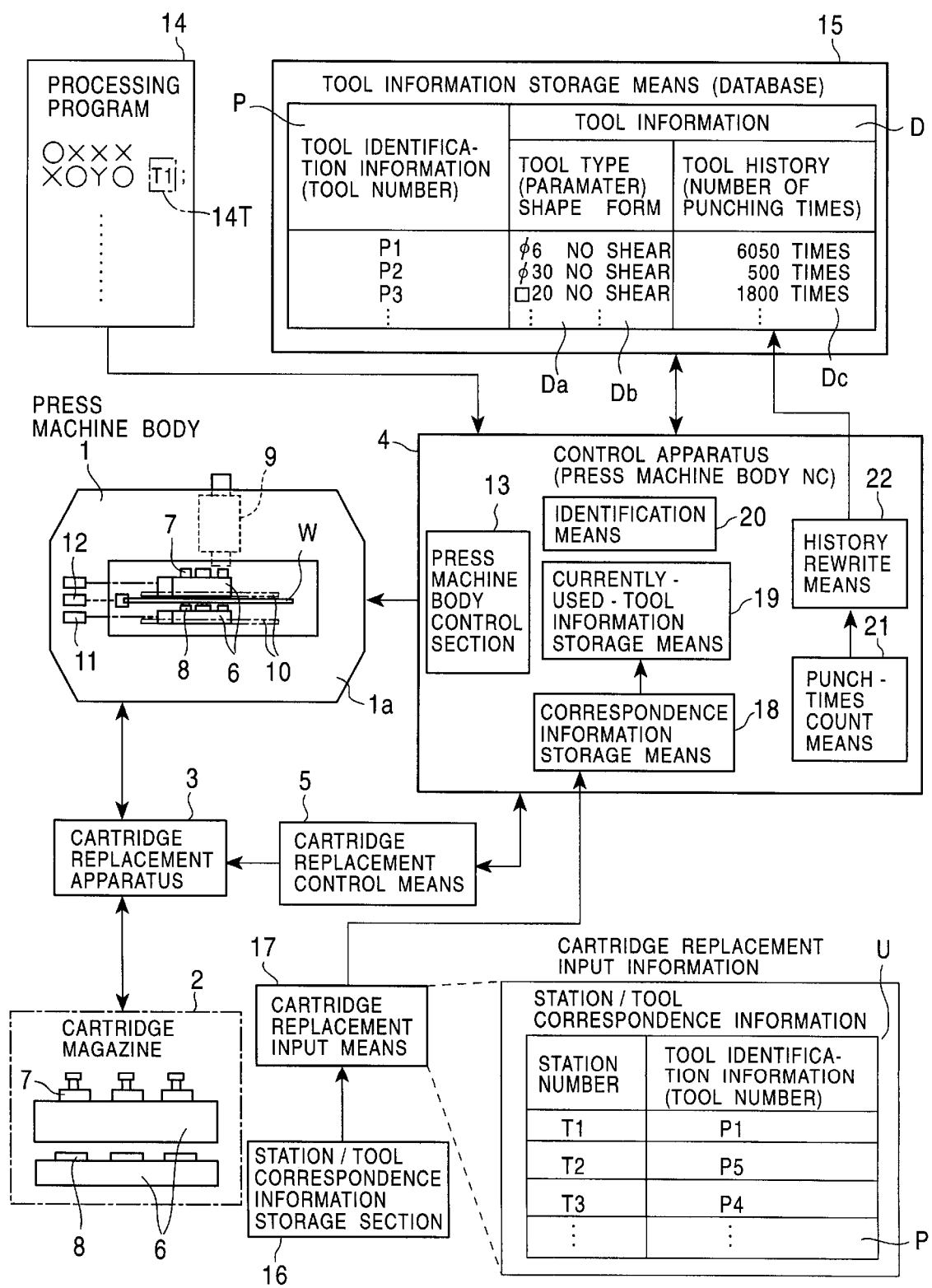
FIG. 1 is a block diagram showing a conceptual configuration of a press machine according to one embodiment of the present invention.

One embodiment of the present invention is described with reference to FIGS. 1 and 3. The press machine shown in these figures is a cartridge type punch press, wherein a cartridge 6 on which a plurality of tools 7, 8 are mounted is replaced for processing. The machine is mainly composed of a press machine body 1 that processes a workpiece W using at least one cartridge 6, a cartridge magazine 2, a cartridge replacement apparatus 3, a control means 4 for the press machine body 1 and a cartridge replacement control means 5.

The press machine body 1 process the workpiece W using a vertical pair of cartridges 6, 6 acting as a tool holder. The vertical pair of cartridges 6 have a plurality of tool stations T (FIG. 3), with a punch tool 7 or a die tool 8 mounted on each of the tool station T. The tool stations T have station numbers T1, T2, . . . , respectively. The vertical pair of cartridges 6 are supported so as to move back and forth along vertical guides 10, 10 provided in a press frame 1a, and are moved by a cartridge driving apparatus 11 so as to be indexed at a position at which any tool 7 or 8 is opposed to a press head 9. The press head 9 has a ram that beats the punch tool 7 and a punch drive source that drives the ram. The punch drive source may be mechanical or hydraulic, but in this example, comprises a servo motor. The workpiece W is moved by a workpiece feeding apparatus 12 on a table (not shown in the drawings) in the moving direction of the cartridges 6 and the direction perpendicular thereto.

The cartridge magazine 2 houses a plurality of vertical pairs of cartridges 6. The cartridge replacement apparatus 3 replaces the vertical pair of cartridges 6 between the press machine body 1 and the cartridge magazine 2. The cartridge replacement apparatus 3 is controlled by a cartridge replacement control means 5 comprising an NC apparatus.

The control means 4 controls the press machine body 1 according to a processing program 14 and is composed of a computerized NC ("Numerically Controlled") apparatus and a programmable controller. A press body control section 13 provided in the control means 4 is a means for outputting processing instructions to the press machine body 1 instructing it to drive the press head 9, the cartridge driving apparatus 11, and the workpiece feeding apparatus 12. The control means 4 has a currently-used-tool information storage means 19 for storing parameters for a tool currently used for punching, and the press body control section 13 controls the speed at which the press head elevates and lowers the ram, according to tool information such as the tool parameters stored in the currently-used-tool information storage means 19.

The punch press according to this embodiment, having the above configuration, registers tool information such as tool parameters and history in a tool information storage means 15 together with tool numbers. To replace a cartridge, the cartridge replacement input means 17 inputs only tool identification information P. This reduces the time required to replace the cartridge and prevents input errors. Specifically, in addition to the tool information storage means 15 and the cartridge replacement input means 17, the punch press includes in the control means 4, a correspondence information storage section 18, an identification means 20, a punch-times count means 21, and a history rewrite means 22, and also includes a station/tool correspondence information storage means 16 as described below.

The tool information storage means 15 stores plural pieces of tool information D and plural pieces of tool identification information P for each tool 7 or 8 in such a way that the pieces of information mutually correspond, and stores such information for all tools 7 and 8 used for at least one press machine. The tool information storage means 15 is a database that may be provided in a storage means installed in the control means 4, or that may be provided separate from the control apparatus 4 or the press machine body 1 by connecting the storage means 15 to the apparatus 4 or the body 1 through signal transmission paths. The tool information storage means 15 may be provided in, for example, the cartridge replacement control means 5, a memory for an exclusive tool management computer, or a press machine of the same type that is installed in the same factory. The tool information storage means 15 is constantly linked with the control means 4 to enable reads and writes as required.

The tool identification information P is information specific to a set of tools (in this example, the punch tool 7 and the die tool 8, but if a separate stripper is provided, the set includes the punch tool 7, the die tool 8, and the stripper), and is given as tool numbers. The tool identification information P, comprising tool numbers, is set in such a way that the numbers are not duplicated within the same machine or the same factory.

The tool numbers are not only added virtually to the tools 7 and 8 but also added physically so as to be recognized by some method. For example, they are marked on the surface of the tools 7 and 8 so that a tool replacement operator can visually recognize them, or are provided on the tools 7 and 8 using bar a codes or memory chips so as to be electronically recognized.

The tool information D comprises tool type information Da, Db and tool history information Dc. The tool type information Da, Db is generally called "tool parameters" and comprises in this example, information Da on the shape of the tool (shape and size) and information Db on the form of the tool indicating the use of shear. Other tool type information may include clearance and the type of the stripper.

The information Dc on the history of the tool denotes the number of punches executed using the tool 7 or 8.

To replace the cartridge, the cartridge replacement input means 17 inputs the tool identification information P to the control means 4 each time the tool is replaced. In this example, the cartridge replacement input means 17 inputs to the control means 4, station/tool correspondence information U for a single cartridge that indicates the station numbers Ti, T2, . . . of the cartridge 6 and the corresponding tool identification information P1, P2, . . . on the tools 7 and 8 installed on the tool stations T. The cartridge replacement input means 17 may be an input means such as a keyboard from which the operator manually inputs data, but in this example, the station/tool correspondence information U is read from the station/tool correspondence information storage means 16 and input to the control means 4.

The station/tool correspondence information storage means 16 stores the station/tool correspondence information U, and comprises, for example, a storage medium such as memory chip or a card which is provided on the individual cartridge 6. The storage medium may be fixed to the cartridge 6 or may be detached therefrom. FIG. 3a illustrates a modified cartridge 6a on which a storage medium, i.e., station/tool correspondence information storage means 16a, is fixed. In addition, the station/tool correspondence information storage means 16 is controlled separately from the cartridge 6 and may be provided in a storage means for a computer. It may be provided in, for example, the cartridge replacement control means 5 or a storage means for a tool management computer.

The correspondence information storage section 18 provided in the control means 4 is a means for storing the station/tool correspondence information U input from the cartridge replacement input means 17.

An identification means 20 uses the tool identification information P input from the cartridge replacement input means 17 in order to identify the tool information D on the plurality of tools 7 and 8 stored in the tool information storage means 15. In this example, the identification means 20 uses the tool identification information P in the station/tool correspondence information U stored in the correspondence Information storage section 18 in order to identify the tool information D in the tool information storage means 15.

The punch-times count means 21 counts the number of times that each of the tools 7 and 8 on the cartridge 6 used in the press machine body 1 has been actually punched by the press head 9. The number of punching times is counted in a predetermined processing unit. For example, the count value may be cleared each time the tools 7 or 8 (the tools used for punching) that is handled by the press head 9 are replaced, or alternatively, the count value for each of the tools 7 and 8 may be accumulated until the processing of a single workpiece W is finished. Finally, the count value for each of the tools 7 and 8 may be accumulated until the cartridge 6 in the press machine body 1 is replaced. The history rewrite means 22 writes the number of punching times stored in the tool information storage means 15 as the tool history Dc based on the number of punching times counted by the punch-times count means 21. Rewrite timings are based on the counting unit used by the punch-times count means 21.

Figure 2:
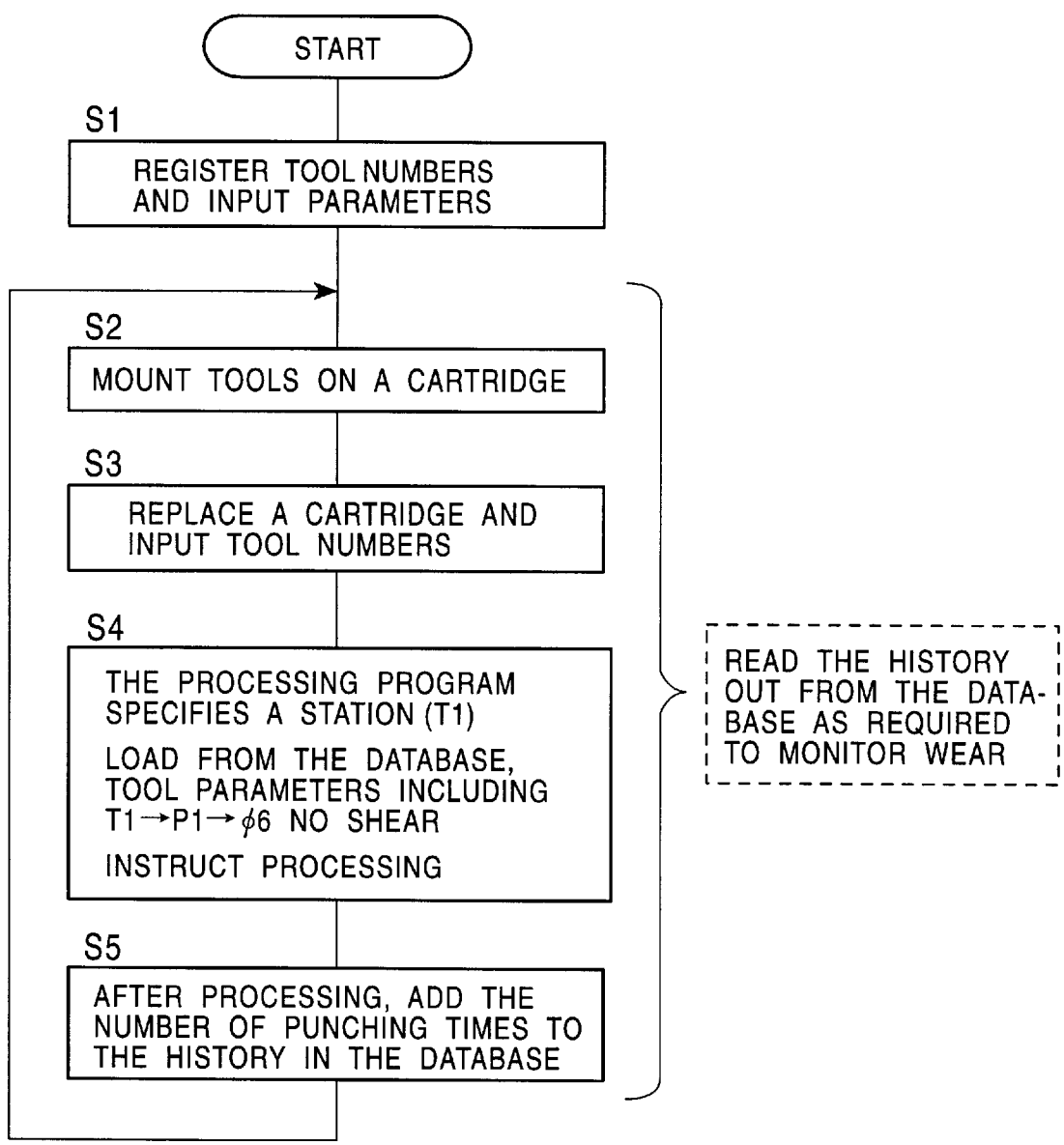
FIG. 2 is a flowchart of the control operation of the press machine.

The operation of the above configuration is described with reference to the flowchart in FIG. 2. First, as a preliminary step, the tool identification information (tool numbers) P on the tools 7 and 8 are registered in the tool information storage means 15, and parameters constituting the tool information D are input to the storage means 15 (step S1). In addition, the tools 7 and 8 are mounted on each cartridge 6 that is provided in the cartridge magazine 2 (S2).

When the cartridge in the press machine body 1 is replaced, the cartridge replacement input means 17 inputs the station/tool correspondence information U to the correspondence information storage section 18 as an input of tool numbers (S3).

Prior to punching, the processing program 14 specifies the station number T1, T2, . . . as a tool instruction 14T (S4). In response to the tool instruction 14T, the control means 4 uses the press machine body control section 13 to control the indexing of the tools in the press machine body 1, and recognizes the tool identification information P in the station/tool correspondence information U stored in the correspondence information storage section 18. The control section then uses the tool identification information P to identify the corresponding tool information D in the tool information storage means 15, and loads the information (tool parameters) Da and Db on that tool type in the currently-used-tool information storage means 19. When, for example, the tool instruction 14T from the processing program 14 is for (T1), a tool number P1 is identified from the station/tool correspondence information U, and based on this number P1, tool information D indicating $\phi 6$ and no shear" is obtained from the tool information storage means 15. The press machine body control section 13 uses each of the tool parameters in the tool information D loaded in the currently-used tool information storage means 19 in order to output a processing instruction such that punching can be optimally controlled. For example, a curve denoting the variation of a punch stroke speed is controlled according to the corresponding tool parameter.

Once predetermined processing has been finished, the numbers of punching times counted by the punch-times count means 21 for the individual tools 7 and 8 during the processing are added to the tool history Dc of the corresponding tool numbers P in the tool information storage means 15. This addition, that is, rewrite is executed by the history rewrite means 22. The operation or processing from the mounting of the tools on the cartridge 6 (S2) through the addition of the number of punching times (S5) is repeated. The mounting of the tools on the cartridge 6 (S2) Is executed only when required, and the process normally returns from the addition of the number of punching times (S5) to the replacement of the cartridge (S3). The tool history information Dc stored in the tool information storage means 15 can be read out as required, thereby enabling the tools 7 and 8 to be monitored for wear.

This press machine requires only the tool identification information P (specifically, the station/tool correspondence information U) to be input in order to replace the cartridge. It can optimize processing using appropriate tool parameters and control wear to the tools 7 and 8 by monitoring the tool history, without any need to manually input to the control means 4, tool parameters such as shape, size, and type and/or tool information D such as the tool history Dc.

Figure 4:
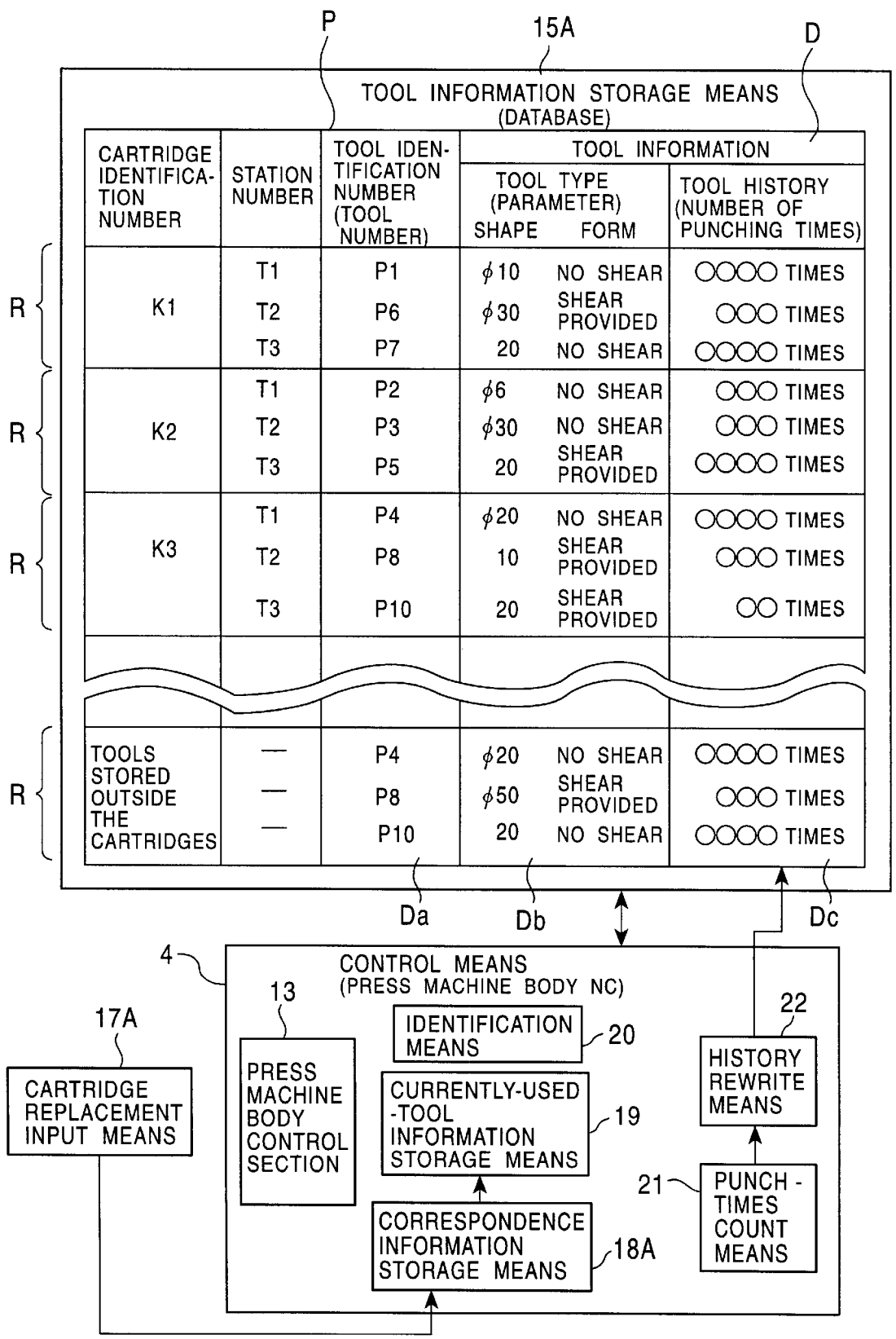
FIG. 4 is a block diagram showing a conceptual drawing of a press machine according to a proposed example.

FIG. 4 shows a proposed example of a press machine. This example is the embodiment shown in FIG. 1 wherein the tool information storage means 15 is substituted by a tool information storage means 15A that stores the tool identification information P and tool information D for each cartridge. In a store region R that stores the tool identification information P and tool information D for each cartridge, the information on the tools 7 and 8 installed on the respective stations T on the cartridge 6 is stored in such a way as to correspond to the station numbers T1, T2, . . . The number of store regions R for the respective cartridges is preferably set larger than the number of cartridges provided in a single press machine. In addition, one of the store regions R stores the tool identification information P and tool information D on the tools 7 and 8 that are not mounted on the cartridges 6 in such a way that the pieces of information mutually correspond. A cartridge replacement input means 17A inputs cartridge numbers K1, K2, . . . to the control means 4. A correspondence information storage section 18A in the control means 4 is a region in which the input cartridge numbers are stored.

According to this proposed example, in response to the tool instruction 14T from the processing program 14 (FIG. 1), the identification means 20 uses the cartridge number in the correspondence information storage section 18A to select from the station numbers T1, T2, . . . in that store region R of the tool information storage means 15A which belongs to the corresponding cartridge number, and loads the currently-used-tool information storage means 19 with the tool information D identified by the tool identification information P for the selected station numbers T1, T2, . . . The other configuration and functionality of the proposed example are the same as in the embodiment shown in FIGS. 1 to 3. The tool history information Dc in the tool information storage means 15A is rewritten by the history rewrite means 22 as described above.

In the proposed example, a large amount of tool information D is divided for each cartridge unit (for example, the number of tools is about 12 to 30) for management, thereby enabling fast and easy retrievals and modifications. The simple input of the cartridge number enables the rewrite of tool information D such as the tool parameters Da and Db, which is required when replacing the cartridge.

In addition, the tool information D on the tools 7 and 8 used for processing can be distinguished from the tool information D on the tools 7 and 8 not used for processing, using the cartridge numbers, thereby enabling the tool information D on the tools 7 and 8 not used for processing to be rewritten safely. This configuration allows external arrangements to be dealt with during processing and enables the tool information D in the tool information storage means 15A to be changed during processing.

In addition, if the set number of store regions R for the respective cartridges is larger than the capacity of the cartridge in the press machine, the following advantage is also obtained. A new store region R must be created each time cartridges having a new tool layout are introduced, but with a relatively large available capacity, the needs for re-entry of information is eliminated in the reuse of a previously created tool layout.

Although the above embodiment and the proposed example control the punch tool 7 and the die tool 8 as a set, the tools 7 and 8 may be individually controlled. In this case, for example, in the above embodiment, the tool identification information P is specific to each of the tools 7 and 8, and the tool information storage means 15 stores the tool information D on each of the tools 7 and 8 so as to correspond to the tool identification information P. The station/tool correspondence information U indicates the station numbers and the corresponding tool identification information on the punch tool 7 and the die tool 8.

The current die management usually manages punch tool and die tool as a set, but in relation to processing thicknesses of workpieces, only the die is replaced with one having a different clearance to the punch which must remain unchanged. In such a case, the punch tool 7 and the die tool 8 must be individually managed.

In addition, although the above embodiment has been described in conjunction with the application to the cartridge type punch press, the present invention is applicable to various other press machines such as turret type punch presses.

The present press machine includes the storage means for storing the tool information and tool identification information on each tool and the input means for inputting the tool identification information, and the control means has the identification means for identifying the stored tool information on the plurality of tools based on the input tool identification information. This configuration obviates the needs for manual input of tool information to the control apparatus which is otherwise required to replace the tool, thereby reducing the time required to arrange for the replacement of the tool and also avoiding input errors.

If the tool information consists of the tool type information and the tool history information, the tool history information indicates the number of times that the tool has been punched, and the control means causes the history rewrite means to rewrite the tool history information In the tool information stored in the storage means, then the history of the tools can be read out and thus the tools can be simply monitored for wear.

In addition, if the tool identification information is specific to the individual tools, the tool information can be further simply managed.

What is claimed is:

1. A press machine, comprising:
    a press machine body, including a press head and also including a plurality of tool holders, each of said tool holders having a plurality of stations therein, each of said stations mounting thereon a punch tool or a die tool in order to process workpieces;
    wherein said tool holders are replaceable, and at least one of the plurality of tool holders is installed in said press machine body for punching so that the punch tools or die tools mounted on the same tool holders are replaceable at the same time, and wherein said at least one installed tool holder is selectively indexable such that a desired punch tool or die tool is opposed to the press head to be driven thereby;
    a control means for controlling the press machine, said control means having a correspondence information storage section for storing station and tool correspondence information which comprises plural pieces of station information and tool identification information for identifying which punch tool or die tool is located at a particular station;
    a storage means for storing tool information and the tool identification information for each punch tool or die tool in such a way that the pieces of information mutually correspond;
    each of said tool holders having a storage medium provided thereon for storing the station and tool correspondence information, said station and tool correspondence information indicating station numbers of the tool holders and tool numbers of the tools;
    an input means for inputting said tool identification information, said input means reading the station and tool correspondence information of the at least one installed tool holder from a respective storage medium thereon and inputting the station and tool correspondence information from the at least one installed tool holder to said control means; and
    wherein said control means includes an identification means for identifying the tool information stored in the storage means for the plurality of punch tools or die tools based on the input tool identification information, and
    wherein said control means has a currently-used-tool-information storage means for storing the tool information on the punch tool or die tool that is opposed to the press head, said tool information of the punch tool or die tool that is opposed to the press head being associated with the tool identification information stored in the correspondence information storage section.

2. The press machine as in claim 1, wherein said tool information comprises information on tool types and history of the punch tools or die tools, said tool history information comprising a number of punching times for which the punch tools or die tools has been used, said control means including a history rewrite means for counting the number of punching times to rewrite the tool history information in the tool information stored in said storage means.

3. The press machine as in claim 1 or claim 2, wherein said tool identification information comprises numbers specific to the individual punch tools or die tools.

4. The press machine as in claim 1 or claim 2, wherein when at least one of the tool holders in the press machine body are replaced with a new one, said input means inputs to said control means, the tool identification information on a plurality of punch tools or die tools held on the newly replaced tool holder.

5. The press machine as in claim 1 or claim 2, further comprising a magazine in which said plurality of tool holders are housed; and a tool holder replacement means provided between said magazine and said press machine body that executes punching using at least one tool holder, in order to replace the at least one tool holder.

6. The press machine as in claim 1 or claim 2, wherein said input means inputs to said control means, said tool identification information and the station information for the tool holders on which the punch tools or die tools are held, the identification means in said control means using said tool identification information based on the station information described in a processing program and identifying the tool information stored in said storage means.

7. A press machine as in claim 1 or claim 2 characterized in that said control means controls punching according to the tool information identified by the identification means.

8. The press machine as in claim 7, wherein said control means controls a punching speed according to said tool information.

* * * * *